Oct. 30, 1923.
P. CAPOCCI
1,472,550
SIGNAL INDICATOR FOR AUTOMOBILES
Filed July 21, 1922   2 Sheets-Sheet 1
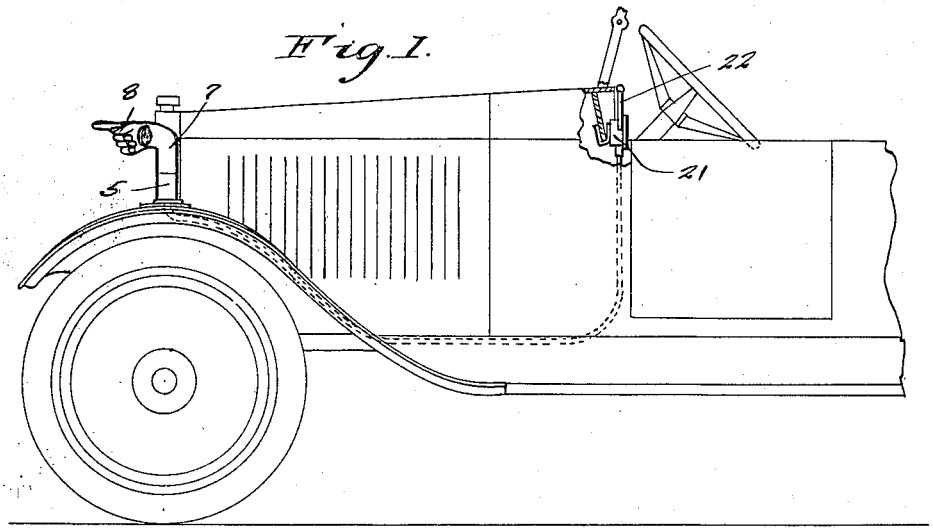
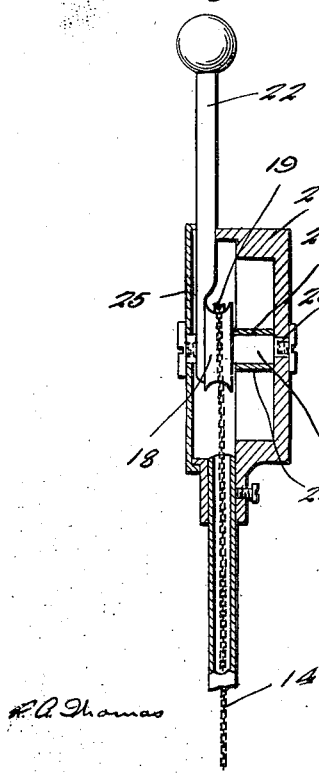
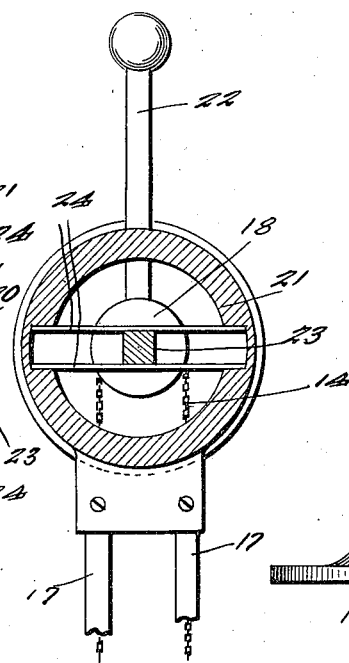
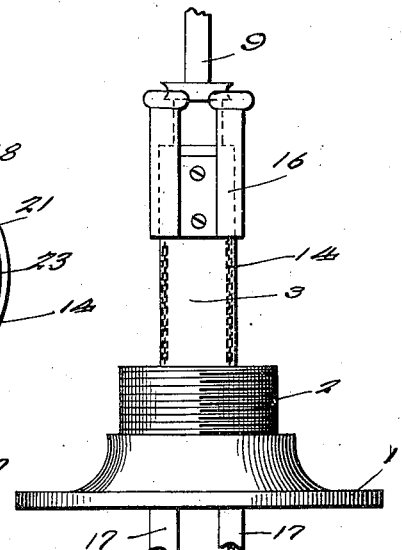
Pompeo Capocci
INVENTOR
BY Victor J. Evans
ATTORNEY Oct. 30, 1923.
P. CAPOCCI
1,472,550
SIGNAL INDICATOR FOR AUTOMOBILES
Filed July 21, 1922
2 Sheets-Sheet 2
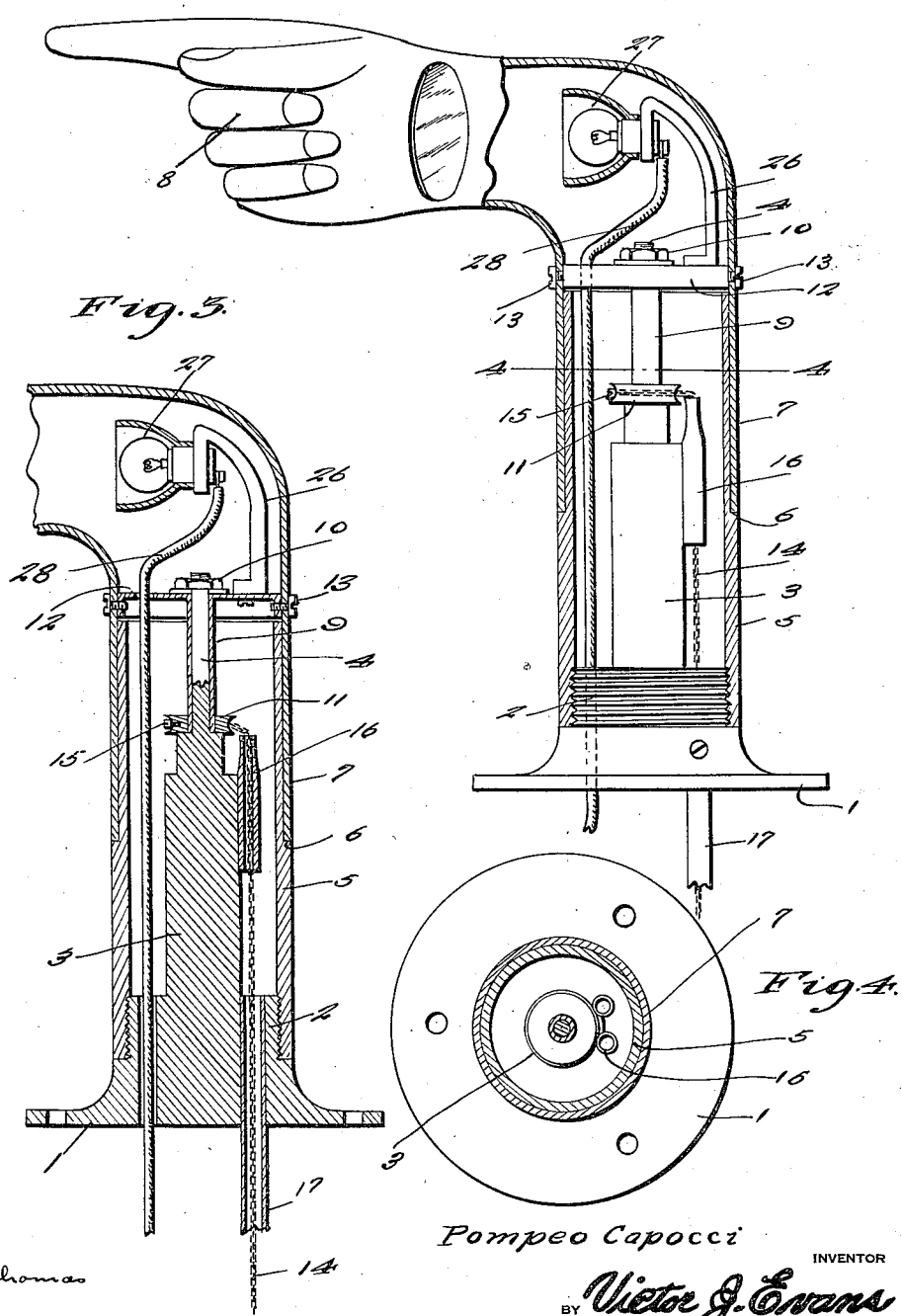
Pompeo Capocci
INVENTOR Patented Oct. 30, 1923.

1,472,550

UNITED STATES PATENT OFFICE.

POMPEO CAPOCCI, OF PROVIDENCE, RHODE ISLAND.

SIGNAL INDICATOR FOR AUTOMOBILES.

Application filed July 21, 1922. Serial No. 576,598.

*To all whom it may concern:*

Be it known that I, POMPEO CAPOCCI, a subject of the King of Italy, residing at Providence, in the county of Providence and State of Rhode Island, have invented new and useful Improvements in Signal Indicators for Automobiles, of which the following is a specification.

This invention relates to a directional signal for motor vehicles, the general object of the invention being to provide a rotatable member which is arranged to be actuated from a point adjacent the driver's seat, for indicating when the vehicle is to be turned to the right or left so that pedestrians and other drivers will be informed as to the intentions of the driver of the vehicle on which the signal is placed.

Another object of the invention is to provide means for illuminating the signal so that it will be visible during night.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention in use upon an automobile.

Figure 2 is an enlarged longitudinal sectional view through the device, the interior parts being shown in elevation.

Figure 3 is a view similar to Figure 2 but showing the interior parts in section.

Figure 4 is a section on line 4—4 of Figure 2.

Figure 5 is a sectional view taken through the signal actuating means.

Figure 6 is a similar view taken at right angles to Figure 5.

Figure 7 is a fragmentary view of a portion of the signal with parts removed.

In these views 1 indicates a base which is adapted to be bolted or otherwise secured to a part of the vehicle. The base has connected therewith a screw threaded part 2, an upright 3 and a vertically arranged shaft 4 which has its upper extremity screw threaded. A shell 5 has its lower end threaded to engage the threaded part 2 and the upper part of the shell is reduced exteriorly to provide the annular shoulder 6 which is located about midway the ends of the shell. A tubular member 7 fits over this reduced part with its lower end engaging the shoulder so that said member is rotatably mounted on the shell. The upper part of the member is bent at right angles and is made either in the form of a hand, as shown at 8 in the drawings, or in the form of an arrow or the like so as to point the direction in which the vehicle is to be turned. A sleeve 9 fits over the shaft 4 and rests upon the upper part of the upright 3. The sleeve is held on the shaft by a nut 10. The sleeve has secured to its lower end a pulley 11 and carries disc 12 at its upper end. The tubular member 7 is fastened to the disc by the screws 13. An endless chain or cable 14 passes around the pulley 11 and is secured thereto by the set screw 15. This cable passes through the twin guides 16 and through the conduits 17 which lead it to a point adjacent the driver's seat where it passes around a pulley 18, to which it is secured by a set screw 19. This pulley is carried by a shaft 20 located in a casing 21 which is adapted to be secured to a part of the vehicle. A handle 22 is connected with the shaft 20 so as to partially rotate the same and thus actuate the pointer. The shaft 20 is provided with a square part 23 which is engaged by a pair of springs 24 which are arranged in the casing 21. These springs act to hold the actuating parts in their adjusted positions. The case may be provided with a cover 25 which moves with the pulley and the handle. A bracket 26 is secured to the disc 12 and said bracket carries an electric lamp and reflector 27, the lamp of which is connected by a conductor 28 with the battery of the car or other suitable source of current. Portions of the tubular member are made of transparent material so as to permit the rays of light from the lamp to pass through the same.

From the foregoing it will be seen that the hand or pointer 8 can be moved by the actuating means in the car to point the direction in which the car is to travel in. For instance, if the car is to make a right hand turn the pointer would be moved so that it will point to the right, thus notifying pedestrians and drivers of other vehicles that the car is to make a turn to the right. The indicator will remain pointing to the right until the lever 22 is returned to its normal position when the pointer will point straight ahead. When the car is to turn to the left the parts are actuated to make the pointer point to the left.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A vehicle signal of the character described comprising a base, an upright shaft formed in the base and having a reduced upper end, a sleeve surrounding the reduced end and being mounted thereon for rotation, a pulley secured to the lower end of the sleeve and a disk carried by the upper end thereof, a shell rising from the base and inclosing the shaft, a tubular member arranged over the shell in overlapping engagement and being rotatably mounted thereon, a pointer formed on the tubular member and being secured to the disk for rotation therewith, means carried by the disk for illuminating the pointer and a flexible element secured to the pulley as and for the purpose specified.

In testimony whereof I affix my signature.

POMPEO CAPOCCI.